United States Patent
Wagner et al.

(10) Patent No.: US 11,945,949 B2
(45) Date of Patent: *Apr. 2, 2024

(54) POLYAMIDE COMPOSITION FOR THE PRODUCTION OF WELDABLE MOULDED BODIES

(71) Applicant: BASF SE, Ludwigshafen am Rhein (DE)

(72) Inventors: Sebastian Wagner, Ludwigshafen (DE); Stefan Mochev, Ludwigshafen (DE); Michael Roth, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 22 days.

This patent is subject to a terminal disclaimer.

(21) Appl. No.: 16/757,704

(22) PCT Filed: Nov. 22, 2018

(86) PCT No.: PCT/EP2018/082201
§ 371 (c)(1),
(2) Date: Apr. 20, 2020

(87) PCT Pub. No.: WO2019/101851
PCT Pub. Date: May 31, 2019

(65) Prior Publication Data
US 2021/0198487 A1    Jul. 1, 2021

(30) Foreign Application Priority Data
Nov. 23, 2017 (EP) .................... 17203368

(51) Int. Cl.
C08L 77/06 (2006.01)
B29C 71/02 (2006.01)
B29K 77/00 (2006.01)

(52) U.S. Cl.
CPC ............. *C08L 77/06* (2013.01); *B29C 71/02* (2013.01); *B29K 2077/00* (2013.01); *C08L 2205/025* (2013.01)

(58) Field of Classification Search
CPC ........... C08L 2205/02; C08L 2205/025; C08L 77/02; C08L 77/06; C08L 2205/03; C08L 77/04
See application file for complete search history.

(56) References Cited

U.S. PATENT DOCUMENTS

| 4,885,340 A | 12/1989 | Hamada |
| 6,265,081 B1 | 7/2001 | Urabe |
| 6,369,137 B2 | 4/2002 | Kersjes et al. |
| 8,278,381 B2 | 10/2012 | Engelmann et al. |
| 8,293,823 B2 | 10/2012 | Engelmann et al. |
| 2004/0242757 A1 | 12/2004 | Ulrich |
| 2006/0155066 A1 | 7/2006 | Crevecoeur |
| 2013/0253115 A1 | 9/2013 | Jeol |
| 2016/0168380 A1* | 6/2016 | Jeol .................. C08L 77/00 264/319 |
| 2016/0177060 A1 | 6/2016 | Endtner |
| 2017/0137622 A1 | 5/2017 | Miyamoto et al. |

FOREIGN PATENT DOCUMENTS

| CN | 102112526 A | 6/2011 |
| CN | 102112549 A | 6/2011 |
| CN | 105713383 A | 6/2016 |
| DE | 102004049342 A1 | 4/2006 |
| DE | 102004050025 A1 | 4/2006 |
| DE | 102017100932 A1 | 7/2017 |
| EP | 0584567 A2 | 3/1994 |
| EP | 1041109 A2 | 10/2000 |
| EP | 1060216 A1 | 12/2000 |
| EP | 1095030 A1 | 5/2001 |
| EP | 3034554 A1 | 6/2016 |
| FR | 1025 E | 12/1961 |
| JP | H11293105 A | 10/1999 |
| JP | 2000061983 A | 2/2000 |
| JP | 2000345031 A | 12/2000 |
| JP | 2005535743 A | 11/2005 |
| JP | 2009191871 A | 8/2009 |
| JP | 2012107188 A | 6/2012 |
| JP | 2013155279 A | 8/2013 |
| KR | 20160034353 A | 3/2016 |
| WO | 1999045071 A1 | 9/1999 |
| WO | 2010014801 A1 | 2/2010 |
| WO | 2013033287 A2 | 3/2013 |
| WO | 2013139802 A1 | 9/2013 |
| WO | 2016202577 A1 | 12/2016 |

OTHER PUBLICATIONS

English Translation of International Search Report for International Application No. PCT/EP2018/082201, dated Feb. 13, 2019, 3 pages.

* cited by examiner

*Primary Examiner* — Ana L. Woodward

(74) *Attorney, Agent, or Firm* — Armstrong Teasdale LLP

(57) ABSTRACT

Disclosed is a polyamide composition including 30% to 99.9% by weight of a polyamide mixture as component A). Component A) includes aliphatic polyamide A1) and aliphatic copolyamide or terpolyamide A2). The weight ratio of A1) to A2) is 55:45 to 95:5. The polyamide composition also includes 0% to 60% by weight of glass fibers as component B), 0% to 2% by weight of nigrosin as component C), 0.1% to 10% by weight of at least one polyhydric alcohol including more than two hydroxyl groups and a number-average molecular weight ($M_n$) of less than 2000 as component D), 0% to 20% by weight of further additives as component E). The reported amounts sum to 100% by weight based on the total composition.

10 Claims, 1 Drawing Sheet

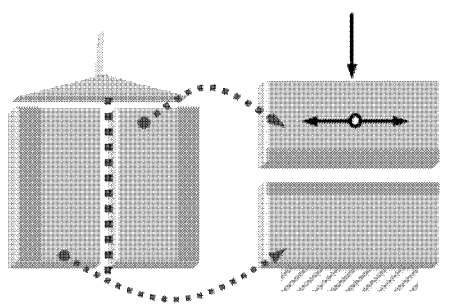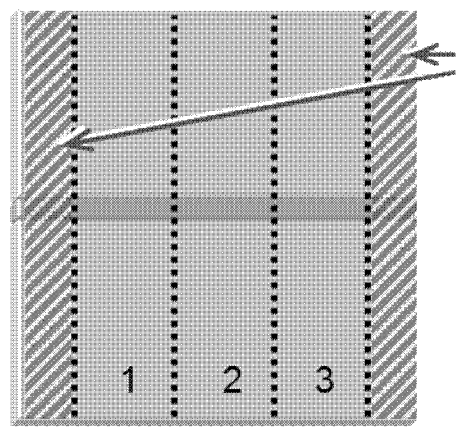

POLYAMIDE COMPOSITION FOR THE PRODUCTION OF WELDABLE MOULDED BODIES

CROSS-REFERENCE TO RELATED APPLICATIONS

This application is a U.S. National Phase Application of PCT/EP2018/082201, filed Nov. 22, 2018, which claims the benefit of priority to EP Application No. 17203368.0, filed Nov. 23, 2017, the contents of which are hereby expressly incorporated by reference in their entirety.

The invention relates to a polyamide composition suitable for producing welded shaped articles, to processes for the production thereof and to the use thereof and to processes for increasing weld seam strength after thermal aging of shaped articles produced from polyamide compositions.

Polyamides are among the polymers produced on a large scale globally and, in addition to their main fields of use in films, fibers and shaped articles (materials), serve a multitude of other end uses. Among the polyamides, polyamide-6 (polycaprolactam PA 6) and polyamide-6,6 (Nylon, polyhexamethyleneadipamide) are the polymers produced in the largest volumes. Most polyamides of industrial significance are semicrystalline thermoplastic polymers featuring a high thermal stability.

Shaped articles made of polyamides may be produced by welding for example, such as friction welding, hot gas welding or laser transmission welding.

EP-B-1 060 216 relates to a polyamide composition for friction-weldable shaped articles, wherein the composition (A) comprises 100 parts by weight of a polyamide mixture of (a) polyamide 6 and (b) an aliphatic polyamide copolymer and/or an aliphatic polyamide terpolymer, wherein the weight ratio of (a) to (b) is 95:5 to 50:50, and (B) 10 to 100 parts by weight of an inorganic reinforcer based on the weight of the polyamide mixture. 0.1 to 6 parts by weight of plasticizer are preferably additionally co-used. The plasticizer is selected from low molecular weight poly(ethylene glycol) esters having no free hydroxyl groups or carboxyl groups and long-chain alkyl polyesters having a terminal carboxyl group and a terminal hydroxyl group. Preferred plasticizers are 2-ethylhexanoic acid-terminated (N=9) poly(ethylene glycol)esters and long chain alkyl polyesters. Copolymers employed are a polyamide 66/6 copolymer or a polyamide 6/66/610 terpolymer.

It is further known from WO 2010/014801 to produce heat-resistant polyamide shaped articles in which the polyamide is admixed with polyhydric alcohols, such as pentaerythritol, dipentaerythritol, tripentaerythritol, di-trimethylolpropane, D-mannitol, D-sorbitol or xylitol. Polyamide mixtures are also employable. In the exemplary embodiments the polyamide mixtures comprise a relatively large proportion of an at least semiaromatic polyamide and a relatively small proportion of an aliphatic polyamide.

The shaped articles produced from the polyamides are said to have good mechanical properties even after relatively lengthy thermal aging at high temperatures.

DE-A-10 2017 100 932 relates to hydroxy-functional dendritic polymers as adhesion promoters. These dendrimers having a multiplicity of terminal hydroxyl groups are used as adhesion promoters inter alia for polyamides to increase the adhesive force on the surface of an adhesive, in particular an adhesive comprising isocyanate groups.

It is an object of the present invention to provide polyamide compositions suitable for producing welded shaped articles having an elevated weld seam strength after thermal aging.

The object is achieved in accordance with the invention by a polyamide composition comprising
  a) 30% to 99.9% by weight of a polyamide mixture as component A) composed of aliphatic polyamide A1) and aliphatic copolyamide or terpolyamide A2), wherein the weight ratio of A1) to A2) is 55:45 to 95:5,
  b) 0% to 60% by weight of glass fibers as component B),
  c) 0% to 2% by weight of nigrosin as component C),
  d) 0.1% to 10% by weight of at least one polyhydric alcohol comprising more than two hydroxyl groups and a number-average molecular weight ($M_n$) of less than 2000 as component D),
  e) 0% to 20% by weight of further additives as component E),
wherein the reported amounts summing to 100% by weight are based on the total composition.

The object is further achieved by a process for producing the polyamide composition by mixing the ingredients while heating to a temperature in the range from 160° C. to 340° C.

The object is further achieved by the use of the polyamide compositions for producing weldable moldings or welded shaped articles and by weldable moldings or welded shaped articles made of this polyamide composition.

The object is further achieved by the use of polyhydric alcohols having more than two hydroxyl groups and a number-average molecular weight ($M_n$) of less than 2000 in polyamide compositions comprising at least one polyamide and at least one copolyamide or terpolyamide for increasing weld seam strength after thermal aging of shaped articles produced by welding of at least two moldings composed of the polyamide composition.

The object is further achieved by a process for increasing weld seam strength after thermal aging of shaped articles produced from polyamide compositions comprising at least one polyamide and at least one copolyamide or terpolyamide by welding at least two moldings, wherein before production of the moldings and the shaped article the polyamide composition is admixed with 0.1% to 10% by weight based on the total polyamide composition of at least one polyhydric alcohol having more than two hydroxyl groups and a number-average molecular weight ($M_n$) of less than 2000.

It has been found according to the invention that a combination of aliphatic polyamide A1) and aliphatic copolyamide or terpolyamide A2) with a polyhydric alcohol of component D) results in polyamide compositions that may be used to produce advantageous welded moldings in which the breaking elongation or tensile strength is maintained even after prolonged heat treatment at high temperatures, for example a heat treatment at 180° C. for 500 hours.

When using an (aliphatic) polyamide or a polyamide mixture of (aliphatic) polyamide and copolyamide the mechanical properties obtained for a shaped article are often insufficient and markedly deteriorate further as a result of thermal aging.

The use of polyhydric alcohols in polyamide compositions typically impairs mechanical properties, especially in the case of welded shaped articles. This is a result of chemical decomposition of the base polymer by the alcohol (reduction in viscosity number) while short-chain alcohols also have a tendency for migration at certain concentrations and combinations.

It is only through combination of polyamides with copolyamides or terpolyamides and polyhydric alcohols are polyamide compositions obtained which show good mechanical properties that do not decline excessively even after relatively lengthy thermal aging. Welded shaped articles additionally show a high breaking elongation before and after thermal aging. These effects are apparent especially for a combination of aliphatic polyamide with aliphatic copolyamide or tar polyamide.

Addition of nigrosin further improves mechanical properties since nigrosin disrupts and thus retards crystallization.

The polyamide compositions according to the invention comprise 30% to 99.9% by weight, preferably 40% to 99.5% by weight, in particular 50% to 98.5% by weight of the component A).

They further comprise 0% to 60% by weight, preferably 0% to 40% by weight, especially 0% to 30% by weight, of the component B). When component B) is present the minimum amount is preferably 5% by weight, particularly preferably at least 10% by weight, in particular at least 15% by weight. This results in ranges of 5% to 60% by weight, preferably 10% to 40% by weight, particularly preferably 15% to 30% by weight, of the component B).

Component C) is employed in an amount of 0% to 2% by weight, preferably 0% to 1% by weight, particularly preferably 0% to 0.5% by weight. If component C) is co-used the lower limit is preferably 0.1% by weight, particularly preferably 0.15% by weight, in particular 0.2% by weight. This results in quantity ranges of 0.1% to 2% by weight, preferably 0.15% to 1% by weight, particularly preferably 0.2% to 0.5% by weight.

The component D) is employed in an amount of 0.1% to 10% by weight, preferably 0.5% 5% by weight, in particular 1.5% to 3% by weight.

Component E) is employed in an amount of 0% to 20% by weight, preferably 0% to 10% by weight, in particular 0% to 5% by weight. If component E) is co-used the lower limit is preferably 0.1% by weight, particularly preferably at least 0.2% by weight, in particular at least 0.3%. This results in ranges of 0.1% to 20% by weight, preferably 0.2% to 10% by weight, particularly preferably 0.3% to 5% by weight, in particular 0.3% to 2% by weight.

When components B), C) and/or E) are present the maximum amount of the component A) is reduced correspondingly by the minimum amounts of the respective components and/or the sum of these minimum amounts. When component B) is present in a minimum amount of 5% by weight the maximum amount of the component A) for example is thus reduced to 94.9% by weight.

If in addition the minimum amounts of components C) and E) of in each case 0.1% by weight are present the maximum amount of the component A) is thus reduced to 94.7% by weight. The other quantity ranges are treated correspondingly and the total amount of the components A) bis E) therefore always sums to 100% by weight.

The present invention relates to special polyamide compositions based on aliphatic polyamides and copolyamides/terpolyamides. The invention also relates generally to the use of polyhydric alcohols of the component D) in polyamide compositions comprising at least one polyamide and at least one copolyamide or terpolyamide, Polyamides suitable for the use and the process are hereinbelow generally referred to as synthetic polyamides of the component A). This describes both polyamides and copolyamides/terpolyamides. The aliphatic (co)polyamides present in the polyamide compositions are described hereinbelow.

The polyamide composition according to the invention comprises at least one synthetic polyamide as component A1 and A2. In the context of the present invention the term "synthetic polyamide" is to be interpreted broadly. It very generally covers polymers incorporating at least one component which is suitable for polyamide formation and is selected from dicarboxylic acids, diamines, salts of at least one dicarboxylic acid and at least one diamine, lactams, ω-amino acids, aminocarbonitriles and mixtures thereof. As well as the components suitable for polyamide formation, the synthetic polyamides of the invention may also comprise monomers copolymerizable therewith in copolymerized form. The term "synthetic polyamide" does not include natural polyamides, such as peptides and proteins, for example hair, wool, silk and albumen.

In the context of the present invention the polyamides are referred to using abbreviations, some of which are customary in the art, which consist of the letters PA followed by numbers and letters. Some of these abbreviations are standardized in DIN EN ISO 1043-1. Polyamides which can be derived from aminocarboxylic acids of the $H_2N-(CH_2)_x-COOH$ type or the corresponding lactams are identified as PA Z where Z denotes the number of carbon atoms in the monomer. For example, PA 6 represents the polymer of ε-caprolactam or of ω-aminocaproic acid. Polyamides derivable from diamines and dicarboxylic acids of the $H_2N-(CH_2)_x-NH_2$ and $HOOC-(CH_2)_y-COOH$ types are identified as PA Z1Z2 where Z1 denotes the number of carbon atoms in the diamine and Z2 the number of carbon atoms in the dicarboxylic acid. Copolyamides are designated by listing the components in the sequence of their proportions, separated by slashes. For example, PA 66/610 is the copolyamide of hexamethylenediamine, adipic acid and sebacic acid. For the monomers having an aromatic or cycloaliphatic group which are used in accordance with the invention, the following letter abbreviations are used:
T=terephthalic acid, I=isophthalic acid, MXDA=m-xylylenediamine, IPDA=isophoronediamine, PACM=4,4'-methylenebis(cyclohexylamine), MACM=2,2'-dimethyl-4,4'-methylenebis(cyclohexylamine).

Hereinbelow the expression "$C_1$-$C_4$-alkyl" encompasses unsubstituted straight-chain and branched $C_1$-$C_4$-alkyl groups. Examples of $C_1$-$C_4$-alkyl groups are especially methyl, ethyl, propyl, isopropyl, n-butyl, isobutyl, sec-butyl, tert-butyl (1,1-dimethylethyl).

In the case of the aliphatic dicarboxylic acids, cycloaliphatic dicarboxylic acids, aromatic dicarboxylic acids and monocarboxylic acids recited hereinbelow the carboxyl groups may each be present in underivatized form or in the form of derivatives. In the case of dicarboxylic acids, neither carboxyl group, one carboxyl group or both carboxyl groups may be in the form of a derivative. Suitable derivatives are anhydrides, esters, acid chlorides, nitriles and isocyanates. Preferred derivatives are anhydrides or esters. Anhydrides of dicarboxylic acids may be in monomeric or in polymeric form. Preferred esters are alkyl esters and vinyl esters, more preferably $C_1$-$C_4$-alkyl esters, particularly methyl esters or ethyl esters. Dicarboxylic acids are preferably in the form of mono- or dialkyl esters, more preferably mono- or di-$C_1$-$C_4$-alkyl esters, in particular monomethyl esters, dimethyl esters, monoethyl esters or diethyl esters. Dicarboxylic acids are moreover preferably in the form of mono- or divinyl esters. Dicarboxylic acids are additionally preferably in the form of mixed esters, more preferably mixed esters with different $C_1$-$C_4$-alkyl components, especially methyl ethyl esters.

The components suitable for polyamide formation are preferably selected from pA) unsubstituted or substituted aromatic dicarboxylic acids and derivatives of unsubstituted or substituted aromatic dicarboxylic acids,
pB) unsubstituted or substituted aromatic diamines,
pC) aliphatic or cycloaliphatic dicarboxylic acids,
pD) aliphatic or cycloaliphatic diamines,
pE) monocarboxylic acids,
pF) monoamines,
pG) at least trifunctional amines,
pH) lactams,
pI) ω-amino acids,
pK) compounds distinct from and co-condensable with pA) to pI).

One suitable embodiment is that of aliphatic polyamides. For aliphatic polyamides of the PA Z1 Z2 type (such as PA 66), the proviso applies that at least one of components pC) and pC) must be present and neither of components pA) and pB) may be present. For aliphatic polyamides of the type PA Z (such as PA 6 or PA 12) the proviso applies that at least component pH) must be present.

A further suitable embodiment is that of semiaromatic polyamides. For semiaromatic polyamides the proviso applies that at least one of components pA) and pB) and at least one of components pC) and pD) must be present.

The aromatic dicarboxylic acids pA) are preferably selected from in each case unsubstituted or substituted phthalic acid, terephthalic acid, isophthalic acid, naphthalenedicarboxylic acids or diphenyldicarboxylic acids, and the derivatives and mixtures of the aforementioned aromatic dicarboxylic acids.

Substituted aromatic dicarboxylic acids pA) preferably have at least one (e.g. 1, 2, 3 or 4) $C_1$-$C_4$-alkyl radical. In particular, substituted aromatic dicarboxylic acids A) have 1 or 2 $C_1$-$C_4$-alkyl radicals. These are preferably selected from methyl, ethyl, n-propyl, isopropyl, n-butyl, isobutyl, sec-butyl and tert-butyl, more preferably methyl, ethyl and n-butyl, particularly methyl and ethyl and especially methyl. Substituted aromatic dicarboxylic acids pA) may also bear further functional groups which do not disrupt the amidation, for example 5-sulfoisophthalic acid, and salts and derivatives thereof. A preferred example thereof is the sodium salt of dimethyl 5-sulfoisophthalate.

The aromatic dicarboxylic acid A) is preferably selected from unsubstituted terephthalic acid, unsubstituted isophthalic acid, unsubstituted naphthalenedicarboxylic acids, 2-chloroterephthalic acid, 2-methylterephthalic acid, 5-methylisophthalic acid and 5-sulfoisophthalic acid.

It is particularly preferable when the employed aromatic dicarboxylic acid pA) is terephthalic acid, isophthalic acid or a mixture of terephthalic acid and isophthalic acid.

The aqueous solution preferably has a proportion of aromatic dicarboxylic acids among all the dicarboxylic acids of at least 50 mol %, more preferably of 70 mol % to 100 mol %. In a specific embodiment, the semiaromatic polyamides have a proportion of terephthalic acid or isophthalic acid or a mixture of terephthalic acid and isophthalic acid, based on all the dicarboxylic acids, of at least 50 mol %, preferably of 70 mol % to 100 mol %.

The aromatic diamines pB) are preferably selected from bis(4-aminophenyl)methane, 3-methylbenzidine, 2,2-bis(4-aminophenyl)propane, 1,1-bis(4-aminophenyl)cyclohexane, 1,2-diaminobenzene, 1,4-diaminobenzene, 1,4-diaminonaphthalene, 1,5-diaminonaphthalene, 1,3-diaminotoluene(s), m-xylylenediamine, N,N'-dimethyl-4,4'-biphenyldiamine, bis(4-methylaminophenyl)methane, 2,2-bis(4-methylaminophenyl)propane or mixtures thereof.

The aliphatic or cycloaliphatic dicarboxylic acids pC) are preferably selected from oxalic acid, malonic acid, succinic acid, glutaric acid, adipic acid, pimelic acid, suberic acid, azelaic acid, sebacic acid, undecane-α,ω-dicarboxylic acid, dodecane-α,ω-dicarboxylic acid, maleic acid, fumaric acid or itaconic acid, cis- and trans-cyclohexane-1,2-dicarboxylic acid, cis- and trans-cyclohexane-1,3-dicarboxylic acid, cis- and trans-cyclohexane-1,4-dicarboxylic acid, cis- and trans-cyclopentane-1,2-dicarboxylic acid, cis- and trans-cyclopentane-1,3-dicarboxylic acid and mixtures thereof.

The aliphatic or cycloaliphatic diamines pD) are preferably selected from ethylenediamine, propylenediamine, tetramethylenediamine, heptamethylenediamine, hexamethylenediamine, pentamethylenediamine, octamethylenediamine, nonamethylenediamine, decamethylenediamine, undecamethylenediamine, dodecamethylenediamine, 2-methylpentamethylenediamine, 2,2,4-trimethylhexamethylenediamine, 2,4,4-trimethylhexamethylenediamine, 5-methylnonamethylenediamine, 2,4-dimethyloctamethylenediamine, 5-methylnonanediamine, bis(4-aminocyclohexyl)methane, 3,3'-dimethyl-4,4'-diaminodicyclohexylmethane and mixtures thereof.

The diamine D) is more preferably selected from hexamethylenediamine, 2-methylpentamethylenediamine, octamethylenediamine, nonamethylenediamine, 2-methyl-1,8-octamethylenediamine, decamethylenediamine, undecamethylenediamine, dodecamethylenediamine, bis(4-aminocyclohexyl)methane, 3,3'-dimethyl-4,4'-diaminodicyclohexylmethane and mixtures thereof.

In a specific embodiment the semiaromatic polyamides comprise at least one copolymerized diamine pD) selected from hexamethylenediamine, bis(4-aminocyclohexyl)methane (PACM), 3,3'-dimethyl-4,4'-diaminodicyclohexylmethane (MACM), isophoronediamine (IPDA) and mixtures thereof.

In a specific embodiment the semiaromatic polyamides comprise exclusively hexamethylenediamine as the copolymerized diamine pD).

In a further specific embodiment the semiaromatic polyamides comprise exclusively bis(4-aminocyclohexyl)methane as the copolymerized diamine pD).

In a further specific embodiment the semiaromatic polyamides comprise exclusively 3,3'-dimethyl-4,4'-diaminodicyclohexylmethane (MACM) as the copolymerized diamine pD).

In a further specific embodiment the semiaromatic polyamides comprise exclusively isophoronediamine (IPDA) as the copolymerized diamine pD).

The aliphatic and the semiaromatic polyamides may comprise at least one copolymerized monocarboxylic acid pE). The monocarboxylic acids E) serve to end-cap the polyamides produced according to the invention. Suitable monocarboxylic acids are in principle all of those capable of reacting with at least some of the amino groups available under the reaction conditions of the polyamide condensation. Suitable monocarboxylic acids pE) are aliphatic monocarboxylic acids, alicyclic monocarboxylic acids and aromatic monocarboxylic acids. These include acetic acid, propionic acid, n-, iso- or tert-butyric acid, valeric acid, trimethylacetic acid, caproic acid, enanthic acid, caprylic acid, pelargonic acid, capric acid, undecanoic acid, lauric acid, tridecanoic acid, myristic acid, palmitic acid, stearic acid, pivalic acid, cyclohexanecarboxylic acid, benzoic acid, methylbenzoic acids, α-naphthalenecarboxylic acid, β-naphthalenecarboxylic acid, phenylacetic acid, oleic acid, ricinoleic acid, linoleic acid, linolenic acid, erucic acid, fatty acids from soya, linseeds, castor oil plants and sunflowers, acrylic acid, methacrylic acid, Versatic® acids, Koch® acids and mixtures thereof.

If the monocarboxylic acids pE) employed are unsaturated carboxylic acids or derivatives thereof it may be advantageous to operate in the presence of commercial polymerization inhibitors.

It is particularly preferable when the monocarboxylic acid E) is selected from acetic acid, propionic acid, benzoic acid and mixtures thereof.

In a specific embodiment the aliphatic and the semiaromatic polyamides comprise exclusively propionic acid as the copolymerized monocarboxylic acid E).

In a further specific embodiment the aliphatic and the semiaromatic polyamides comprise exclusively benzoic acid as the copolymerized monocarboxylic acid pE).

In a further specific embodiment the aliphatic and the semiaromatic polyamides comprise exclusively acetic acid as the copolymerized monocarboxylic acid pE).

The aliphatic and the semiaromatic polyamides may comprise at least one copolymerized monoamine pF). The aliphatic polyamides then comprise only copolymerized aliphatic monoamines or alicyclic monoamines. The monoamines pF) serve to end-cap the polyamides produced according to the invention. Suitable monoamines are in principle all of those capable of reacting with at least some of the carboxylic acid groups available under the reaction conditions of the polyamide condensation. Suitable monoamines pF) are aliphatic monoamines, alicyclic monoamines and aromatic monoamines. These include methylamine, ethylamine, propylamine, butylamine, hexylamine, heptylamine, octylamine, decylamine, stearylamine, dimethylamine, diethylamine, dipropylamine, dibutylamine, cyclohexylamine, dicyclohexylamine, aniline, toluidine, diphenylamine, naphthylamine and mixtures thereof.

At least one at least trivalent amine pG) may additionally be used to produce the aliphatic and the partially aromatic polyamides. These include N'-(6-aminohexyl)hexane-1,6-diamine, N'-(12-aminododecyl)dodecane-1,12-diamine, N'-(6-aminohexyl)dodecane-1,12-diamine, N'-[3-(aminomethyl)-3,5,5-trimethylcyclohexyl]hexane-1,6-diamine, N'-[3-(aminomethyl)-3,5,5-trimethylcyclohexyl]dodecane-1,12-diamine, N'-[(5-amino-1,3,3-trimethylcyclohexyl)methyl]hexane-1,6-diamine, N'-[(5-amino-1,3,3-trimethylcyclohexyl)methyl]dodecane-1,12-diamine, 3-[[[3-(aminomethyl)-3,5,5-trimethylcyclohexyl]amino]methyl]-3,5,5-trimethylcyclohexanamine, 3-[[[(5-amino-1,3,3-trimethylcyclohexyl)methylamino]methyl]-3,5,5-trimethylcyclohexanamine, 3-(aminomethyl)-N-[3-(aminomethyl)-3,5,5-trimethylcyclohexyl]-3,5,5-trimethylcyclohexanamine. It is preferable when no at least trifunctional amines G) are used.

Suitable lactams pH) are ε-caprolactam, 2-piperidone (δ-valerolactam), 2-pyrrolidone (γ-butyrolactam), capryllactam, enantholactam, lauryllactam and mixtures thereof.

Suitable ω-amino acids pI) are 6-aminocaproic acid, 7-aminoheptanoic acid, 11-aminoundecanoic acid, 12-aminododecanoic acid and mixtures thereof.

Suitable compounds pK) distinct from and co-condensable with pA) to pI) are at least tribasic carboxylic acids, diaminocarboxylic acids, etc.

Suitable compounds (k) further include 4-[(Z)—N-(6-aminohexyl)-C-hydroxycarbonimidoyl]benzoic acid, 3-[(Z)—N-(6-aminohexyl)-C-hydroxycarbonimidoyl]benzoic acid, (6Z)-6-(6-aminohexylimino)-6-hydroxyhexanecarboxylic acid, 4-[(Z)—N-[(5-amino-1,3,3-trimethylcyclohexyl)methyl]-C-hydroxycarbonimidoyl]benzoic acid, 3-[(Z)—N-[(5-amino-1,3,3-trimethylcyclohexyl)methyl]-C-hydroxycarbonimidoyl]benzoic acid, 4-[(Z)—N-[3-(aminomethyl)-3,5,5-trimethylcyclohexyl]-C-hydroxycarbonimidoyl]benzoic acid, 3-[(Z)—N-[3-(aminomethyl)-3,5,5-trimethylcyclohexyl]-C-hydroxycarbonimidoyl]benzoic acid and mixtures thereof.

The polyamide is preferably selected from PA 4, PA 5, PA 6, PA 7, PA 8, PA 9, PA 10, PA 11, PA 12, PA 46, PA 66, PA 666, PA 69, PA 610, PA 612, PA 96, PA 99, PA 910, PA 912, PA 1212, PA 6.T, PA 9.T, PA 8.T, PA 10.T, PA 12.T, PA 6.I, PA 8.I, PA 9.I, PA 10.I, PA 12.I, PA 6.T/6, PA 6.T/10, PA 6.T/12, PA 6.T/6.I, PA6.T/8.T, PA 6.T/9.T, PA 6.T/10T, PA 6.T/12.T, PA 12.T/6.T, PA 6.T/6.I/6, PA 6.T/6.I/12, PA 6.T/6.I/6.10, PA 6.T/6.I/6.12, PA 6.T/6.6, PA 6.T/6.10, PA 6.T/6.12, PA 10.T/6, PA 10.T/11, PA 10.T/12, PA 8.T/6.T, PA 8.T/66, PA 8.T/8.I, PA 8.T/8.6, PA 8.T/6.I, PA 10.T/6.T, PA 10.T/6.6, PA 10.T/10.I, PA 10T/10.I/6.T, PA 10.T/6.I, PA 4.T/4.I/46, PA 4.T/4.I/6.6, PA 5.T/5.I, PA 5.T/5.I/5.6, PA 5.T/5.I/6.6, PA 6.T/6.I/6.6, PA MXDA.6, PA IPDA.I, PA IPDA.T, PA MACM.I, PA MACM.T, PA PACM.I, PA PACM.T, PA MXDA.I, PA MXDA.T, PA 6.T/IPDA.T, PA 6.T/MACM.T, PA 6.T/PACM.T, PA 6.T/MXDA.T, PA 6.T/6.I/8.T/8.I, PA 6.T/6.I/10.T/10.I, PA 6.T/6.I/IPDA.T/IPDA.I, PA 6.T/6.I/MXDA.T/MXDA.I, PA 6.T/6.I/MACM.T/MACM.I, PA 6.T/6.I/PACM.T/PACM.I, PA 6.T/10.T/IPDA.T, PA 6.T/12.T/IPDA.T, PA 6.T/10.T/PACM.T, PA 6.T/12.T/PACM.T, PA 10.T/IPDA.T, PA 12.T/IPDA.T and copolymers and mixtures thereof.

In a preferred embodiment the polyamide composition according to the invention comprises at least one aliphatic polyamide A1 as component A).

The aliphatic polyamide is then preferably selected from PA 4, PA 5, PA 6, PA 7, PA 8, PA 9, PA 10, PA 11, PA 12, PA 46, PA 66, PA 666, PA 69, PA 610, PA 612, PA 96, PA 99, PA 910, PA 912, PA 1212 and copolymers and mixtures thereof.

The aliphatic polyamide A1 is in particular selected from PA 6, PA 66 oder PA 12. One specific embodiment is that of polyamide compositions in which the component A) comprises PA 66 or consists of PA 66.

A semiaromatic polyamide/copolyamide is preferably selected from PA 6.T, PA 9.T, PA 10.T, PA 12.T, PA 6.I, PA 9.I, PA 10.I, PA 12.I, PA 6.T/6.I, PA 6.T/6, PA6.T/8.T, PA 6.T/10T, PA 10.T/6.T, PA 6.T/12.T, PA12.T/6.T, PA IPDA.I, PA IPDA.T, PA 6.T/IPDA.T, PA 6.T/6.I/IPDA.T/IPDA.I, PA 6.T/10.T/IPDA.T, PA 6.T/12.T/IPDA.T, PA 6.T/10.T/PACM.T, PA 6.T/12.T/PACM.T, PA 10.T/IPDA.T, PA 12.T/IPDA.T and copolymers and mixtures thereof.

In the context of the present invention the number-average molecular weights $M_n$ and weight-average molecular weights $M_w$ which follow are based on a determination by gel permeation chromatography (GPC). Calibration was performed using for example PMMA as the polymer standard having a low polydispersity.

The synthetic polyamide, for example A1 or A2, preferably has a number-average molecular weight $M_n$ in a range from 8 000 to 50 000 g/mol, more preferably from 10 000 to 35 000 g/mol.

The synthetic polyamide, for example A1 or A2, preferably has a number-average molecular weight $M_n$ in a range from 15 000 to 200 000 g/mol, more preferably from 20 000 to 125 000 g/mol.

The polyamides, for example A1 or A2, preferably have a polydispersity PD ($=M_w/M_n$) of not more than 6, more preferably of not more than 5, especially of not more than 3.5.

By contrast, in the polyamide compositions according to the invention the polyamide mixture A) comprises aliphatic polyamide A1) and aliphatic copolyamide or terpolyamide A2). The corresponding components may be selected from the components recited hereinabove.

The aliphatic polyamide A1) is preferably selected from: PA 4, PA 5, PA 6, PA 7, PA 8, PA 9, PA 10, PA 11, PA 12, PA 46, PA 66, PA 69, PA 610, PA 612, PA 96, PA 99, PA 910, PA 912, PA 1212.

The aliphatic polyamide A1) is particularly preferably selected from polyamide 6, polyamide 66 and mixtures thereof.

The aliphatic copolyamide or terpolyamide A2 is preferably constructed from the monomers of two or three polyamides selected from PA 4, PA 5, PA 6, PA 7, PA 8, PA 9, PA 10, PA 11, PA 12, PA 46, PA 66, PA 69, PA 610, PA 612, PA 96, PA 99, PA 910, PA 912, PA 1212.

Specific examples of copolyamide are PA 66/6, PA 66/68, PA 66/610, PA 66/612, PA 66/10, PA 66/12, PA 6/68, PA 6/610, PA 6/612, PA 6/10, PA 6/12. Examples of suitable terpolymers are PA 6/66/610, PA 6/66/69, PA 6/66/11, PA 6/66/12, PA 6/610/11, PA 6/610/12, 6/66/PACM.

The aliphatic copolyamide is preferably a PA 6/PA 66 copolymer.

Suitable aliphatic polyamides and copolyamides/terpolyamides are additionally recited in in EP-B-1 060 216.

The weight ratio of aliphatic polyamide A1) to aliphatic copolyamide or terpolyamide A2) is 55:45 to 95:5, preferably from 60:40 to 90:10, especially 70:30 to 90:10.

The crystallization point (crystallization temperature) of the polyamide mixture A) should preferably be below the crystallization points (crystallization temperatures) of the aliphatic polyamide A1) and the aliphatic copolyamide/terpolyamide A2). In the use according to the invention and the process according to the invention too the crystallization point of the mixture of the at least one polyamide and at least one copolyamide or terpolyamide should preferably be below the crystallization points of the at least one polyamide and the at least one copolyamide or terpolyamide.

The addition of the copolyamide/terpolyamide thus preferably has the effect of reducing the crystallization point in the polyamide composition. The reduction or lowering of the crystallization point may be determined by DSC measurement (differential scanning calorimetry).

By combination of the copolyamide/terpolyamide with the optional nigrosin addition the crystallization temperature in the polyamide composition may be reduced further.

The polyamide compositions according to the invention optionally contain glass fibers as component B). When glass fibers are present the maximum permissible amount of component A) is reduced by the minimum amount of glass fibers present.

Specifically, chopped glass fibers are used. The component B) especially comprises glass fibers, it being preferable to employ short fibers. These preferably have a length in the range from 2 to 50 mm and a diameter of 5 to 40 µm. It is alternatively possible to use continuous fibers (rovings). Suitable fibers include those having a circular and/or noncircular cross-sectional area, wherein in the latter case the dimensional ratio of the main cross-sectional axis to the secondary cross-sectional axis is especially >2, preferably in the range from 2 to 8 and particularly preferably in the range from 3 to 5.

In a specific embodiment component B) comprises so-called "flat glass fibers". These specifically have an oval or elliptical cross-sectional area or a necked elliptical (so-called "cocoon" fibers) or rectangular or virtually rectangular cross-sectional area. Preference is given here to using glass fibers with a noncircular cross-sectional area and a dimensional ratio of the main cross-sectional axis to the secondary cross-sectional axis of more than 2, preferably of 2 to 8, in particular of 3 to 5.

Reinforcement of the molding materials according to the invention may also be effected using mixtures of glass fibers having circular and noncircular cross sections. In a specific embodiment the proportion of flat glass fibers, as defined above, predominates, i.e. they account for more than 50% by weight of the total mass of the fibers.

When rovings of glass fibers are used as component B) said fibers preferably have a diameter of 10 to 20 µm, preferably of 12 to 18 µm. The cross section of these glass fibers may be round, oval, elliptical, virtually rectangular or rectangular. So-called flat glass fibers having a ratio of the cross-sectional axes of 2 to 5 are particularly preferred. E glass fibers are used in particular. However, it is also possible to use any other glass fiber types, for example A, C, D, M, S or R glass fibers, or any desired mixtures thereof or mixtures with E glass fibers.

The polyamide molding materials according to the invention can be produced by the known processes for producing long fiber-reinforced rod pellets, especially by pultrusion processes, in which the continuous fiber strand (roving) is fully saturated with the polymer melt and then cooled and chopped. The long fiber-reinforced rod pellets obtained in this manner, which preferably have a pellet length of 3 to 25 mm, especially of 4 to 12 mm, may be processed further to afford moldings by the customary processing methods, for example injection molding or press molding.

The polyamide compositions according to the invention optionally contain nigrosin as component C).

Nigrosin (Solvent Black 7—CAS: 8005-02-5) is a deep black organic dye.

Nigrosin is a mixture of synthetic black colorants and is obtained by heating nitrobenzene, aniline and aniline hydrochloride in the presence of an iron or copper catalyst. Nigrosins occur in various forms (water-soluble, alcohol-soluble and oil-soluble). A typical water-soluble nigrosin is Acid Black 2 (C.I. 50420), a typical alcohol-soluble nigrosin is Solvent Black 5 (C.I. 50415), and a typical oil-soluble nigrosin is Solvent Black 7 (C.I. 50415:1).

However, nigrosin is not entirely unconcerning in terms of a possible damaging effect on health. For example residues of aniline and nitrobenzene may remain in the product as a consequence of production and there is a risk of unwanted decomposition products being formed in the course of subsequent processing by extrusion methods, injection molding methods or spinning methods.

The addition of nigrosin to the polyamide compositions according to the invention can further reduce the crystallization tendency of the polyamide composition since nigrosin disrupts crystallization. The addition results in a slower crystallization/reduction in the crystallization temperature.

At least one polyhydric alcohol having more than two hydroxyl groups and a number-average molecular weight (Mn) of less than 2000 is employed as component D). Such polyols are described for example in WO 2010/014801, see in particular page 14, line 29 to page 16, line 7 therein. The number-average molecular weight is preferably determined by gel permeation chromatography (GPC).

The polyhydric alcohols may be selected from aliphatic hydroxyl compounds having more than two hydroxyl groups, aliphatic-cycloaliphatic compounds having more than two hydroxyl groups, cycloaliphatic compounds having more than two hydroxyl groups, aromatic compounds and saccharides.

An aliphatic chain in polyhydric alcohols may comprise not only carbon but also heteroatoms, such as nitrogen, oxygen or sulfur atoms. A cycloaliphatic ring in the polyhydric alcohol may be a monocycle or part of a dicyclic or polycyclic ring system. It may be carbocyclic or heterocyclic. The polyhydric alcohols may contain one or more substituents, such as ether, carboxylic acid, carboxamide, or carboxylic ester groups.

Examples of suitable polyhydric alcohols are triols, such as glycerol, trimethylolpropane, 2,3-di(2'-hydroxyethyl)cyclohexan-1-ol, hexane-1,2,6-triol, 1,1,1-tris(hydroxymethyl)ethane, 3-(2'-hydroxyethoxy)propane-1,2-diol, 3-(2'-hydroxypropoxy)propane-1,2-diol, 2-(2'-hydroxyethoxy)hexane-1,2-diol, 6-(2'-hydroxypropoxy)hexane-1,2-diol, 1,1,1-tris-[(2'-hydroxyethoxy)methyl]ethane, 1,1,1-tris-[(2'-hydroxypropoxy)methyl]propane, 1,1,1-tris-(4'-hydroxyphenyl)ethane, 1,1,1-tris-(hydroxyphenyl)propane, 1,1,3-tris-(dihydroxy-3-methylphenyl)propane, 1,1,4-tris(dihydroxyphenyl)butane, 1,1,5-tris(hydroxyphenyl)-3-methylpentane, ditrimethylopropane, trimethylolpropane ethoxylates or trimethylolpropane propoxylates, polyols, such as pentaerythritol, dipentaerythritol and tripentaerythritol, and saccharides, such as cyclodextrin, D-mannose, glucose, galactose, sucrose, fructose, xylose, arabinose, D-mannitol, D-sorbitol, D- or L-arabitol, xylitol, iditol, talitol, allitol, altritol, guilitol, erythritol, threitol and D-gulono-γ-lactone.

In preferred polyhydric alcohols the hydroxyl groups are each bonded to carbon atoms separated from one another by at least one atom, preferably a carbon atom. Accordingly the polyhydric alcohol is preferably pentaerythritol, dipentaerythritol, tripentaerythritol, trimethylolpropane, D-mannitol, D-sorbitol or xylitol. It is particularly preferable when the polyhydric alcohol is the dipentaerythritol and/or tripentaerythritol. Dipentaerythritol is most preferred.

The polyamide compositions may contain further additives as component E). If component E) is co-used the upper limit for the component A) is reduced correspondingly.

As component E) the compositions according to the invention comprise 0% to 20% by weight, preferably 0% to 10% by weight and in particular 0% to 5% by weight of further additives. If such additives are co-used the minimum amount is 0.1% by weight, preferably 1% by weight, in particular 3% by weight.

If component E) is co-used the upper limit for the component A) is reduced correspondingly. At a minimum amount of 0.1% by weight of the component E) the upper limit for the amount of the component A) is thus for example about 89.8% by weight.

Contemplated further additives include fillers and reinforcers distinct from glass fibers, thermoplastic polymers distinct from component A or other additives.

In the context of the invention the term "filler and reinforcer" (=possible component E)) is to be interpreted broadly and comprises particulate fillers, fibrous substances and any intermediate forms. Particulate fillers may have a wide range of particle sizes ranging from particles in the form of dusts to large grains. Contemplated filler materials include organic or inorganic fillers and reinforcers. Employable here are for example inorganic fillers, such as kaolin, chalk, wollastonite, talc, calcium carbonate, silicates, titanium dioxide, zinc oxide, graphite, glass particles, for example glass spheres, nanoscale fillers, such as carbon nanotubes, nanoscale sheet silicates, nanoscale alumina ($Al_2O_3$), nanoscale titanium dioxide ($TiO_2$), graphene, permanently magnetic or magnetizable metal compounds and/or alloys, phyllosilicates and nanoscale silicon dioxide ($SiO_2$). The fillers may also have been surface treated.

Examples of phyllosilicates usable in the molding materials according to the invention include kaolins, serpentines, talc, mica, vermiculites, illites, smectites, montmorillonite, hectorite, double hydroxides or mixtures thereof. The phyllosilicates may have been surface treated or may be untreated.

One or more fibrous substances may also be employed. These are preferably selected from known inorganic reinforcing fibers, such as boron fibers, carbon fibers, silica fibers, ceramic fibers and basalt fibers; organic reinforcing fibers, such as aramid fibers, polyester fibers, nylon fibers, polyethylene fibers and natural fibers, such as wood fibers, flax fibers, hemp fibers and sisal fibers.

It is especially preferable to employ carbon fibers, aramid fibers, boron fibers, metal fibers or potassium titanate fibers.

The thermoplastic polymers distinct from component A) are preferably selected from homo- or copolymers which comprise in copolymerized form at least one monomer selected from $C_2$-$C_{10}$-monoolefins, for example ethylene or propylene, 1,3-butadiene, 2-chloro-1,3-butadiene, vinyl alcohol and the $C_2$-$C_{10}$-alkyl esters thereof, vinyl chloride, vinylidene chloride, vinylidene fluoride, tetrafluoroethylene, glycidyl acrylate, glycidyl methacrylate, acrylates and methacrylates having alcohol components of branched and unbranched $C_1$-$C_{10}$-alcohols, vinylaromatics, for example styrene, acrylonitrile, methacrylonitrile, α,β-ethylenically unsaturated mono- and dicarboxylic acids, and maleic anhydride;

homo- and copolymers of vinyl acetals, polyvinyl esters, polyvinylpyrrolidone or polyvinylpyrrolidone copolymers (PVP), polycarbonates (PC), polyesters, such as polyalkylene terephthalates, polyhydroxyalkanoates (PHA), polybutylene succinates (PBS), polybutylene succinate adipates (PBSA), polyethers, polyether ketones, thermoplastic polyurethanes (TPU), polysulfides, polysulfones, polyether sulfones, cellulose alkyl esters and mixtures thereof.

Examples include polyacrylates having identical or different alcohol radicals from the group of $C_4$-$C_8$ alcohols, particularly of butanol, hexanol, octanol and 2-ethylhexanol, polymethylmethacrylate (PMMA), methyl methacrylate-butyl acrylate copolymers, acrylonitrile-butadiene-styrene copolymers (ABS), ethylene-propylene copolymers, ethylene-propylene-diene copolymers (EPDM), polystyrene (PS), styrene-acrylonitrile copolymers (SAN), acrylonitrile-styrene-acrylate (ASA), styrene-butadiene-methyl methacrylate copolymers (SBMMA), styrene-maleic anhydride copolymers, styrene-methacrylic acid copolymers (SMA), polyoxymethylene (POM), polyvinyl alcohol (PVAL), polyvinyl acetate (PVA), polyvinyl butyral (PVB), polycaprolactone (PCL), polyhydroxybutyric acid (PHB), polyhydroxyvaleric acid (PHV), polylactic acid (PLA), ethyl cellulose (EC), cellulose acetate (CA), cellulose propionate (CP) or cellulose acetate/butyrate (CAB).

The at least one thermoplastic polymer present in the molding material according to the invention is preferably polyvinyl chloride (PVC), polyvinyl butyral (PVB), homo- and copolymers of vinyl acetate, homo- and copolymers of styrene, polyacrylates, thermoplastic polyurethanes (TPUs) or polysulfides.

It may be advantageous to use Solvent Black 28 (CAS No. 12237-23-91) optionally combined with at least one further colorant. Component E) is then preferably selected from non-nucleating colorants distinct from C). These include non-nucleating dyes, non-nucleating pigments and mixtures thereof. Examples of non-nucleating dyes are Solvent Yellow 21 (commercially available as Oracet® Yellow 160 FA from BASF SE) or Solvent Blue 104 (commercially available as Solvaperm® Blue 2B from Clariant). Examples of non-nucleating pigments are Pigment Brown 24 (commercially available as Sicotan® Yellow K 2011 FG from BASF SE). Also useful as component E) are small amounts of at least one white pigment. Suitable white pigments are titanium dioxide (Pigment White 6), barium sulfate (Pigment White 22), zinc sulfide (Pigment White 7) etc. In a specific embodiment the molding material according to the invention comprises 0.001% to 0.5% by weight of at least one white pigment as component E). For example, the molding material may comprise 0.05% by weight of Kronos 2220 titanium dioxide from Kronos.

The manner and amount of the addition is guided by the hue, i.e. the desired shade of the black color. For example, with Solvent Yellow 21, it is possible to move the hue of the black color in the CIELAB color space from, for example, $b^*=-1.0$ in the direction of $+b^*$, i.e. in the yellow direction. This method is known to those skilled in the art as color shading. Measurement is effected in accordance with DIN 6174 "Colorimetric evaluation of colour coordinates and colour differences according to the approximately uniform CIELAB colour space" or the successor standard.

Co-use of carbon black as component E) is also possible. The compositions according to the invention comprise for example 0.01% to 1% by weight, preferably 0.03% to 0.5% by weight, in particular 0.05% to 0.3% by weight, of carbon black Carbon black, also known as industrial carbon black, is a modification of carbon with a high surface-to-volume ratio and consists of 80% to 99.5% by weight of carbon. The specific surface area of carbon black is about 10 to 1500 $m^2/g$ (BET). The carbon black may have been produced in the form of channel black, furnace black, flame black, cracking black or acetylene black. The particle diameters are in the range from 8 to 500 nm, typically 8 to 110 nm. Carbon black is also referred to as pigment black 7 or lamp black 6. Color blacks are nanoparticulate carbon blacks that, due to their fineness, increasingly lose the brown base hue of conventional carbon blacks.

Suitable preferred additives E) are lubricants and heat stabilizers but also flame retardants, light stabilizers (UV stabilizers, UV absorbers or UV blockers), dyes, nucleating agents, metallic pigments, metal flakes, metal-coated particles, antistats, conductivity additives, demolding agents, optical brighteners, defoamers, etc.

As component E) the molding materials according to the invention can comprise preferably 0.01% to 3% by weight, particularly preferably 0.02% to 2% by weight, in particular 0.05% to 1.0% by weight, of at least one heat stabilizer based on the total weight of the composition.

The heat stabilizers are preferably selected from copper compounds, secondary aromatic amines, sterically hindered phenols, phosphites, phosphonites and mixtures thereof.

If a copper compound is used the amount of copper is preferably 0.003% to 0.5% by weight, in particular 0.005% to 0.3% by weight and particularly preferably 0.01% to 0.2% by weight based on the total weight of the composition.

If stabilizers based on secondary aromatic amines are used the amount of these stabilizers is preferably 0.2% to 2% by weight, particularly preferably 0.2% to 1.5% by weight, based on the total weight of the composition.

If stabilizers based on sterically hindered phenols are used the amount of these stabilizers is preferably 0.1% to 1.5% by weight, particularly preferably 0.2% to 1% by weight, based on the total weight of the composition.

If stabilizers based on phosphites and/or phosphonites are used the amount of these stabilizers is preferably 0.1% to 1.5% by weight, particularly preferably from 0.2% to 1% by weight, based on the total weight of the composition.

Suitable compounds E) of mono- or divalent copper are, for example, salts of mono- or divalent copper with inorganic or organic acids or mono- or dihydric phenols, the oxides of mono- or divalent copper or the complexes of copper salts with ammonia, amines, amides, lactams, cyanides or phosphines, preferably Cu(I) or Cu(II) salts of hydrohalic acids or of hydrocyanic acids or the copper salts of aliphatic carboxylic acids. Particular preference is given to the monovalent copper compounds CuCl, CuBr, CuI, CuCN and $Cu_2O$ and to the divalent copper compounds $CuCl_2$, $CuSO_4$, CuO, copper(II) acetate or copper(II) stearate.

The copper compounds are commercially available and/or the production thereof is known to those skilled in the art. The copper compound may be used as such or in the form of concentrates. A concentrate is to be understood as meaning a polymer, preferably of the same chemical nature as component A), comprising the copper salt in a high concentration. The use of concentrates is a customary process and is particularly often employed when very small amounts of an input material are to be added. It is advantageous to employ the copper compounds in combination with further metal halides, in particular alkali metal halides, such as NaI, KI, NaBr, KBr, wherein the molar ratio of metal halide to copper halide is 0.5 to 20, preferably 1 to 10 and particularly preferably 3 to 7.

Particularly preferred examples of stabilizers which are based on secondary aromatic amines and are usable in accordance with the invention include adducts of phenylenediamine with acetone (Naugard® A), adducts of phenylenediamine with linolenic acid, 4,4'-bis(α,α-dimethylbenzyl)diphenylamine (Naugard® 445), N,N'-dinaphthyl-p-phenylenediamine, N-phenyl-N'-cyclohexyl-p-phenylenediamine or mixtures of two or more thereof.

Preferred examples of stabilizers employable according to the invention and based on sterically hindered phenols include N,N'-hexamethylenebis-3-(3,5-di-tert-butyl-4-hydroxyphenyl)propionamide, bis(3,3-bis(4'-hydroxy-3'-tert-butylphenyl)butanoic acid) glycol ester, 2,1'-thioethyl bis(3-(3,5-di-tert-butyl-4-hydroxyphenyl))propionate, 4,4'-butylidenebis(3-methyl-6-tert-butylphenol), triethylene glycol 3-(3-tert-butyl-4-hydroxy-5-methylphenyl)propionate or mixtures of two or more of these stabilizers.

Preferred phosphites and phosphonites are triphenyl phosphite, diphenyl alkyl phosphite, phenyl dialkyl phosphite, tris(nonylphenyl) phosphite, trilauryl phosphite, trioctadecyl phosphite, distearyl pentaerythrityl diphosphite, tris(2,4-di-tert-butylphenyl) phosphite, diisodecyl pentaerythrityl diphosphite, bis(2,4-di-tert-butylphenyl) pentaerythrityl diphosphite, bis(2,6-di-tert-butyl-4-methylphenyl) pentaerythrityl diphosphite, diisodecyloxy pentaerythrityl diphosphite, bis(2,4-di-tert-butyl-6-methylphenyl) pentaerythrityl diphosphite, bis(2,4,6-tris(tert-butylphenyl)) pentaerythrityl diphosphite, tristearylsorbitol triphosphite, tetrakis(2,4-di-tert-butylphenyl)-4,4'-biphenylene diphosphonite, 6-isooctyloxy-2,4,8,10-tetra-tert-butyl-12H-dibenzo-[d,g]-1,3,2-dioxaphosphocin, 6-fluoro-2,4,8,10-tetra-tert-butyl-12-methyldibenzo-[d,g]-1,3,2-dioxaphosphocin, bis(2,4-di-tert-butyl-6-methylphenyl) methyl phosphite and bis(2,4-di-tert-butyl-6-methylphenyl) ethyl phosphite. Preference is given in particular to tris[2-tert-butyl-4-thio(2'-methyl-4'-hydroxy-5'-tert-butyl)phenyl-5-methyl]phenyl phosphite and tris(2,4-di-tert-butylphenyl) phosphite (Hostanox® PAR24: commercially available from BASF SE).

A preferred embodiment of the heat stabilizer consists in the combination of organic heat stabilizers (especially Hostanox® PAR 24 and Irganox® 1010), a bisphenol A-based epoxide (especially Epikote® 1001) and copper stabilization based on CuI and KI. An example of a commercially available stabilizer mixture consisting of organic stabilizers and epoxides is Irgatec® NC66 from BASF SE. Heat stabilization based exclusively on CuI and KI is especially preferred. Aside from the addition of copper or copper compounds, the use of further transition metal compounds, especially metal salts or metal oxides of group VB, VIB, VIIB or VIIIB of the Periodic Table, is ruled out. In addition, it is preferable not to add any transition metals of group VB, VIB, VIIB or VIIIB of the Periodic Table, for example iron powder or steel powder, to the molding material according to the invention.

The molding materials according to the invention comprise 0% to 15% by weight, particularly preferably 0% to 10% by weight, based on the total weight of the composition of at least one flame retardant as additive E). When the inventive molding materials comprise at least one flame retardant, then preferably in an amount of 0.01 to 15% by weight, particularly preferably of 0.1 to 10% by weight, based on the total weight of the composition. Suitable flame retardants include halogen-containing and halogen-free flame retardants and synergists thereof (see also Gächter/Müller, 3rd edition 1989 Hanser Verlag, chapter 11). Preferred halogen-free flame retardants are red phosphorus, phosphinic or diphosphinic salts and/or nitrogen-containing flame retardants such as melamine, melamine cyanurate, melamine sulfate, melamine borate, melamine oxalate, melamine phosphate (primary, secondary) or secondary melamine pyrophosphate, neopentyl glycol boric acid melamine, guanidine and derivatives thereof known to those skilled in the art, and also polymeric melamine phosphate (CAS No.: 56386-64-2 and 218768-84-4 and also EP-A-10 95 030), ammonium polyphosphate, trishydroxyethyl isocyanurate (optionally also ammonium polyphosphate in admixture with trishydroxyethyl isocyanurate) (EP-A-058 456 7). Further N-containing or P-containing flame retardants or PN condensates suitable as flame retardants, as well as the synergists customary therefor such as oxides or borates, may be found in DE-A-10 2004 049 342. Suitable halogenated flame retardants are for example oligomeric brominated polycarbonates (BC 52 Great Lakes) or polypentabromobenzyl acrylates with N greater than 4 (FR 1025 Dead sea bromine), reaction products of tetrabromobisphenol A with epoxides, brominated oligomeric or polymeric styrenes, dechlorane, which are usually used with antimony oxides as synergists (for details and further flame retardants see DE-A-10 2004 050 025).

The polyamide molding materials are produced by processes known per se. These include the mixing of the components in the appropriate proportions by weight. The mixing of the components is preferably accomplished at elevated temperatures by commixing, blending, kneading, extruding or rolling. The temperature during mixing is preferably in a range from 220° C. to 340° C., particularly preferably from 240° C. to 320° C. and especially from 250° C. to 300° C. Suitable processes are known to those skilled in the art.

Moldings/Shaped Articles

The present invention further relates to moldings and shaped articles produced using the polyamide molding materials according to the invention.

Shaped articles are constructed from a plurality, i.e. two or more, moldings, in particular by welding.

The polyamide molding materials may be used for producing moldings and shaped articles by any desired suitable processing techniques. Suitable processing techniques are especially injection molding, extrusion, coextrusion, thermoforming or any other known polymer shaping method. These and further examples may be found for example in "Einfärben von Kunststoffen" [Coloring of Plastics], VDI-Verlag, ISBN 3-18-404014-3.

The polyamide molding materials obtainable by the process according to the invention are further advantageously suitable for use for automotive applications, for production of moldings for electrical and electronic components including especially in the high-temperature sector.

A specific embodiment is that of moldings or shaped articles in the form of or as part of a component part for the automotive sector, especially selected from cylinder head covers, engine covers, housings for charge air coolers, charge air cooler valves, intake pipes, intake manifolds, connectors, gears, fan impellers, cooling water tanks, housings or housing parts for heat exchangers, coolant coolers, charge air coolers, thermostats, water pumps, heating elements, securing parts.

Possible uses in automobile interiors are for dashboards, steering-column switches, seat components, headrests, center consoles, gearbox components and door modules, and possible uses in automobile exteriors are for A, B, C, or D pillar covers, spoilers, door handles, exterior mirror components, windshield wiper components, windshield wiper protective housings, decorative grilles, cover strips, roof rails, window frames, sunroof frames, antenna covers, front and rear lights, engine hoods, cylinder head covers, intake pipes, windshield wipers, and exterior bodywork parts.

A further specific embodiment is that of moldings or shaped articles as such or as part of an electrical or electronic passive or active component, of a printed circuit board, of part of a printed circuit board, of a housing constituent, of a film, or of a wire, more particularly in the form of or as part of a switch, of a plug, of a bushing, of a distributor, of a relay, of a resistor, of a capacitor, of a winding or of a winding body, of a lamp, of a diode, of an LED, of a transistor, of a connector, of a regulator, of an integrated circuit (IC), of a processor, of a controller, of a memory element and/or of a sensor.

Possible uses of the polyamides according to the invention for the kitchen and household sector are for production of components for kitchen machines, for example fryers, irons, knobs, and also applications in the garden and leisure sector, for example components for irrigation systems or garden equipment and door handles.

The polyamide composition for producing moldings is produced by processes known per se. Reference is made here to the abovementioned processes for producing the polyamide composition. These include the mixing of the components in the appropriate proportions by weight. The mixing of the components is preferably accomplished at elevated temperatures by commixing, blending, kneading, extruding or rolling. The temperature during mixing is preferably in a range from 220° C. to 340° C., particularly preferably from 240° C. to 320° C. and especially from 250° C. to 300° C. Premixing of individual components may be advantageous. It is further also possible to produce the moldings directly from a physical mixture (dryblend) of premixed components and/or individual components which has been produced well below the melting point of the polyamide. In that case the temperature during the mixing is preferably 0° C. to 100° C., particularly preferably 10° C. to 50° C., in particular ambient temperature (25° C.). The molding materials may be processed into moldings by customary processes, for example by injection molding or extrusion. Said materials are especially suitable, for example, for materials for covers, housings, accessory parts, sensors, for applications in, for example, the automotive, electrical engineering, electronics, telecommunications, information technology, computer, household, sports, medical, or entertainment sectors.

The polyamide compositions according to the invention are especially suitable for producing weldable moldings and welded moldings (produced from the weldable moldings by welding). The (welded) shaped articles exhibit good mechanical properties after welding. Especially after thermal aging for 2000 hours at 180° C. the tensile strength or breaking stress of the welded shaped articles is very largely maintained. The tensile strength or breaking stress for welded shaped articles falls only slightly after heat treatment for 500 hours at 180° C. Thermal aging is therefore carried out analogously to commonly used specifications from the automobile industry.

The use of the molding materials according to the invention and in particular the co-use of the copolyamides/terpolyamides and optionally nigrosin and the polyols can thus significantly improve the weld seam both initially and after aging. The disadvantages of the molding materials described in WO 2010/014801 and EP-B-1 060 216 for relevant applications can thus be overcome. The shaped articles produced from the polyamide compositions by welding at least two moldings exhibit an improved weld seam strength before and after oxidative and thermal aging.

The welding of the shaped articles may be carried out by any desired welding method, for example by friction welding, hot gas welding or by beam welding, such as laser transmission welding. Corresponding welding methods are known to those skilled in the art and described for example in WO 2013/139802.

The invention is more particularly elucidated hereinbelow by the following examples.

The following input materials were used:
A/1: Polyamide 6: Ultramid® B27 from BASF SE, melting point: 222° C., viscosity number (0.5% in 96% $H_2SO_4$): 150 cm³/g The viscosity numbers of the polyamides were determined according to ISO 307 at 25° C.
A/2: Polyamide 6/polyamide 66 copolymer, Ultramid® C27 from BASF SE, melting point: 195° C. to 197° C., viscosity number (0.5% in 96% $H_2SO_4$): 145 cm³/g The viscosity numbers of the polyamides were determined according to ISO 307 at 25° C.
B: Glass fiber: NEG-T249H, manufacturer: Nippon Electric Glass (Malaysia) SDN. BHD., average diameter: 10.5 µm, length: 3 mm
C: Nigrosin/Solvent Black 7, manufacturer: Colloids Ltd.
D/1: Heat stabilizer: CuI/KI in a molar ratio of 1:4
D/2: Dipentaerythritol (CAS: 126-58-9)
E: Lubricant: EBS, manufacturer: Lonza Cologne GmbH, ethylenebis(stearylamide) (distearylethylenediamine) CAS No. 110-30-5

The ingredients listed in Table 1 herebelow were premixed in a tumble mixer for 10 minutes and then extruded through a twin-screw extruder having a diameter of 25 mm and an L/D ratio of 44 at a barrel temperature of 300° C. and pelletized. To this end the natural-colored polyamide pellet material was first dried in a drying oven at 100° C. for four hours so that the moisture content was below 0.1%. The obtained pellet material was injection-molded on an injection molding machine at a melt temperature of 300° C. to afford plaques having thickness of 2 mm and dimensions of 60×60 mm and were assessed both visually and analytically. Mechanical properties were determined according to DIN ISO 527 or 179-2/1 eU or 179-2/1 eAf (2017 version).

Production of the welded shaped articles was carried out as described below. To this end plaques having dimensions of (110×110×4) mm³ were produced by injection molding. As shown in FIG. 1, the plaques were divided centrally and welded after offsetting. Tensile specimens having a corresponding central weld seam were prepared from the welded plaques. The peripheral area was discarded. Vibration welding was performed with a Branson Type-M-102H machine (~240 Hz) with the following parameters:

| Test specimen: | |
|---|---|
| Geometry | plaque (110 mm × 110 mm × 4 mm) |
| Joining area, mm² | 440 |
| Conditioning before storage | drying 80° C./48 h, vacuum |
| Testing | drying 80° C./48 h, vacuum |
| Welding test: | |
| Method | linear, longitudinal |
| Joining pressure, Mpa | 1.0/2.0/4.0 |
| Amplitude, mm | 0.9 |
| Number of tests per setting, millimeters | 4 |

The tensile test was carried out with a Zwick Type 1446 tensile tester (10 mm/min, room temperature).

The thermal aging was performed according to typical automotive standards. To this end a recirculating oven was temperature-controlled to the correct temperature. Before the respective steps the specimens were dried at 80° C. for 48 h under subatmospheric pressure. They were subsequently stored for the specified time in a temperature-controlled oven.

FIG. 1 shows schematically the dividing of the injection-molded plate at the top left, the welding of the two parts at the top right and the dividing of the welded plate to obtain the test specimens 1, 2 and 3 at the bottom. The shaded peripheral region is discarded.

TABLE 1

|  | C1 | C2 | C3 | E1 | E2 |
|---|---|---|---|---|---|
| A/1 (B27) | 69.2 | 49.2 | 67.7 | 46.5 | 47.7 |
| A/2 (C27) |  | 20 |  | 20 | 20 |
| B (GF) | 30 | 30 | 30 | 30 | 30 |
| D/2 (DiPenta) |  |  | 1.5 | 3 | 1.5 |
| E (EBS) | 0.2 | 0.2 | 0.2 | 0.2 | 0.2 |
| C (Nigrosin) | 0.3 | 0.3 | 0.3 | 0.3 | 0.3 |
| D/1 (CuI/KI) | 0.3 | 0.3 | 0.3 |  | 0.3 |
| Elastic modulus [MPa] | 9635 | 9235 | 9540 | 9588 | 9715 |
| Breaking stress [MPa] | 180 | 173 | 175 | 182 | 172 |
| Breaking elongation [%] | 4.0 | 4.0 | 3.4 | 3.3 | 3.8 |
| Charpy impact strength [KJ/m$^2$] | 91 | 97 | 72 | 83 | 90 |
| Maintenance of breaking stress at 180° C./2000 hours [%] | 85 | 84 | 95 | 96 | 98 |
| Breaking stress for welded shaped articles [MPa] | 83 | 86 | 61 | 84 | 85 |
| Breaking stress for welded shaped article after thermal aging [MPa] | 42 | 39 | 49 | 64 | 65 |
| Maintenance of breaking stress for welded shaped article at 180° C./500 hours [%] | 51 | 45 | 80 | 76 | 77 |
| Crystallization temperature, commencement [° C.] | 184 | 179 | 184 | 178 | 176 |
| Crystallization temperature, peak [° C.] | 167 | 163 | 166 | 160 | 156 |

Comparative example C1 describes a traditional formulation for the automotive sector. Comparative example C2 shows co-use of a copolyamide. In both cases the breaking elongation after thermal aging for welded shaped articles is insufficient.

Comparative example C3 relates to the use of a polyhydric alcohol in a polyamide molding material. The breaking elongation for a welded shaped article is insufficient. It is only through combination of the copolyamide with the polyhydric alcohol in the molding materials that a sufficient breaking stress of the welded shaped article before and after heat aging is achieved.

The invention claimed is:

1. A polyamide composition comprising:
   (a) 30% to 99.9% by weight of a polyamide mixture as component A) composed of aliphatic polyamide A1) and aliphatic copolyamide A2), wherein the weight ratio of A1) to A2) is 55:45 to 95:5;
   (b) 0% to 60% by weight of glass fibers as component B);
   (c) 0% to 2% by weight of nigrosin as component C);
   (d) 0.1% to 10% by weight of at least one polyhydric alcohol comprising more than two hydroxyl groups and a number-average molecular weight (Me) of less than 2000 selected from the group consisting of pentaerythritol, dipentaerythritol, tripentaerythritol, di-trimethylolpropane, D-mannitol, D-sorbitol, and xylitol as component D); and
   (e) 0% to 20% by weight of further additives as component E), wherein component E) is selected from the group consisting of fillers and reinforcing materials different from glass fibers, thermoplastic polymers different from component A), non-nucleated colorants different from C), carbon black, lubricants, heat stabilizers, light stabilizers, dyes, nucleating agents, metallic pigments, metal flakes, metal-coated particles, antistatic agents, conductivity additives, mold-release agents, optical brighteners and antifoams;
   wherein the reported amounts summing to 100% by weight are based on the total composition, the aliphatic polyamide A1) is selected from the group consisting of PA 6, PA 66 and mixtures thereof and the aliphatic copolyamide A2) is a PA 6/PA 66 copolymer;
   wherein the polyamide composition comprises 0 to 15% by weight, based on the total weight of the composition, of at least one flame retardant selected from the group consisting of red phosphorus, nitrogen-containing flame retardants, oligomeric brominated polycarbonates, polypentabromobenzyl acrylates with a degree of polymerization greater than 4, reaction products of tetrabromobisphenol A with epoxides, brominated oligomeric or polymeric styrenes, and Dechlorane.

2. The polyamide composition according to claim 1, wherein 0.1% to 2% by weight of nigrosin is present as component C).

3. A process for producing polyamide compositions according to claim 1 by mixing the ingredients while heating to a temperature in the range from 160° C. to 340° C.

4. A weldable molding or welded shaped article composed of a polyamide composition according to claim 1.

5. The polyamide composition as claimed in claim 1, wherein the crystallization point of the mixture of the aliphatic polyamide A1) and the aliphatic copolyamide A2) in the polyamide composition is below the crystallization points of the at least one polyamide and at least one copolyamide.

6. The polyamide composition according to claim 1, wherein the weight ratio of A1) to A2) is 60:40 to 90:10.

7. The polyamide composition according to claim 1, wherein the weight ratio of A1) to A2) is 70:30 to 90:10.

8. The polyamide composition according to claim 1, wherein the composition does not comprise a flame retardant.

9. The polyamide composition according to claim 1, wherein the crystallization temperature of the polyamide mixture A) is below the crystallization temperatures of the aliphatic polyamide A1) and the aliphatic copolyamide A2).

10. A polyamide composition comprising:
   (a) 30% to 99.9% by weight of a polyamide mixture as component A) composed of aliphatic polyamide A1) and aliphatic copolyamide A2), wherein the weight ratio of A1) to A2) is 55:45 to 95:5;
   (b) 0% to 60% by weight of glass fibers as component B);
   (c) 0% to 2% by weight of nigrosin as component C);
   (d) 0.1% to 10% by weight of at least one polyhydric alcohol comprising more than two hydroxyl groups and a number-average molecular weight (Mn) of less than 2000 selected from glycerol, trimethylolpropane, 2,3-di-(2'-hydroxyethyl)cyclohexan-1-ol, hexane-1,2,6- triol, 1,1,1-tris(hydroxymethyl)ethane, 3-(2'-hydroxyethoxy)propane-1,2-diol, 3-(2' hydroxypropoxy)propane-1,2-diol, 2-(2'-hydroxyethoxy)hexane-1,2-diol, 6-(2'-hydroxypropoxy)hexane-1,2-diol, 1,1,1-tris-[(2'-hydroxyethoxy)methyl]ethane, 1,1,1-tris-[(2'-hydroxypropoxy)methyl]propane, 1,1,1-tris-(4'-hydroxyphenyl)ethane, 1,1,1-tris (hydroxyphenyl)propane, 1,1,3-tris-(dihydroxy-3-methylphenyl)propane, 1,1,4-tris(dihydroxyphenyl)butane, 1,1,5-tris(hydroxyphenyl)-3-methylpentane, ditrimethylopropane, trimethylolpropane ethoxylates, trimethylolpropane propoxylates, pentaerythritol, dipentaerythritol, tripentaerythritol, cyclodextrin, D-mannose, glucose, galactose, sucrose, fructose, xylose, arabinose, D-mannitol, D-sorbitol, D- or L-arabitol, xylitol, iditol, talitol, allitol, altritol, guilitol, erythritol, threitol and D-gulono-y-lactone as component D); and (e) 0% to 20% by weight of further additives as component E), selected from the group consisting of fillers and reinforcing materials different from glass fibers, thermoplastic polymers different from component A), non-nucleated colorants different from C), carbon black, lubricants, heat stabilizers, light stabilizers, dyes, nucleating agents, metallic pigments, metal flakes, metal-coated particles, antistatic agents, conductivity additives, mold-release agents, optical brighteners and antifoams;

wherein the reported amounts summing to 100% by weight are based on the total composition, the aliphatic polyamide A1) is selected from PA 4, PA 5, PA 6, PA 7, PA 8, PA 9, PA 10, PA 11, PA 12, PA 46, PA 66, PA 69, PA 610, PA 612, PA 96, PA 99, PA 910, PA 912, PA 1212 and the aliphatic copolyamide A2) is constructed from monomers of two or three polyamides selected from PA 4, PA 5, PA 6, PA 7, PA 8, PA 9, PA 10, PA 11, PA 12, PA 46, PA 66, PA 69, PA 610, PA 612, PA 96, PA 99, PA 910, PA 912, PA 1212;

wherein the composition does not comprise a flame retardant.

* * * * *